(12) United States Patent
Wallmeier

(10) Patent No.: US 8,330,300 B2  
(45) Date of Patent: Dec. 11, 2012

(54) DEVICE AND METHOD FOR PRODUCING A UNIFORM TEMPERATURE DISTRIBUTION IN AN OBJECT DURING A PRECIPITATION PROCESS

(75) Inventor: Peter Wallmeier, Lippstadt (DE)

(73) Assignee: AEG Power Solutions B.V., Zwanenburg (NL)

( * ) Notice: Subject to any disclaimer, the term of this patent is extended or adjusted under 35 U.S.C. 154(b) by 847 days.

(21) Appl. No.: 12/400,984

(22) Filed: Mar. 10, 2009

(65) Prior Publication Data

US 2009/0229991 A1 Sep. 17, 2009

(30) Foreign Application Priority Data

Mar. 10, 2008 (DE) .................... 20 2008 003 991 U  
Aug. 27, 2008 (DE) ........................ 10 2008 039 958

(51) Int. Cl.
 *H02J 7/00* (2006.01)
(52) U.S. Cl. ....................................................... 307/150
(58) Field of Classification Search ................... 307/150
 See application file for complete search history.

(56) References Cited

U.S. PATENT DOCUMENTS

2003/0127045 A1* 7/2003 Keck et al. ..................... 117/200

FOREIGN PATENT DOCUMENTS

DE 19882883 T1 12/1998  
WO 9736822 A1 10/1997

* cited by examiner

*Primary Examiner* — Robert L. Deberadinis  
(74) *Attorney, Agent, or Firm* — Norris McLaughlin & Marcus, P.A.; Christa Hildebrand (57) ABSTRACT

The present invention relates to a device for supplying current to at least one silicon rod (3) during precipitation of silicon with the Siemens process, wherein the device has at least one input (E) suitable and configured for connecting the device to an electric power grid (N) for supplying electric energy, at least one output (A) to which the at least one silicon rod (3) can be connected, at least one AC current regulator (1) which is suitable and configured to supply the at least one silicon rod (3) connected to the at least one output (A) with electric current from the electric power grid (N), wherein the device further includes at least one frequency converter (2) which is suitable and configured to supply the at least one silicon rod (3) connected to the at least one output (A) with electric current from the electric power grid (N), wherein the electric current has a higher frequency than the current provided by the AC current regulator (1).

26 Claims, 6 Drawing Sheets

DEVICE AND METHOD FOR PRODUCING A UNIFORM TEMPERATURE DISTRIBUTION IN AN OBJECT DURING A PRECIPITATION PROCESS

BACKGROUND OF THE INVENTION (1) Field of the Invention

The present invention relates to a device for supplying current to at least one silicon rod during precipitation of silicon according to the Siemens process. The invention further relates to a method for supplying current to at least one silicon rod during precipitation of silicon according to the Siemens process using the device.

(2) Description of Related Art

Devices for supplying current to a silicon rod during precipitation of silicon according to the Siemens process are known in the art. Such devices have an input for connecting the device to an electric power grid for supplying electric energy. The devices further have at least one output for connection to one or several silicon rods. One or several AC current regulators supply electric current from the electric power grid to the silicon rod(s) connected to the output(s). The current intensity and the voltage and hence also the electric power thermally converted in the silicon rod can be adjusted with the AC current regulator.

When producing silicon rods with the Siemens process, these devices are used to supply current to the silicon rods located inside a reactor. The reactor is filled with trichlorosilane and is under pressure. The power thermally dissipated in the silicon rods as a result of the current flow causes the silicon rods to heat up. The surface temperature of the silicon rods reaches about 1100° C., at which temperature trichlorosilane decomposes and dissociates to silicon and hydrogen chloride under addition of hydrogen. The silicon precipitates on the silicon rod(s) arranged in the reactor. The precipitation process causes an increase in the diameter of the silicon rod during the process by about 1 mm/hour. The cross-sectional area of the silicon rod increases accordingly. With a constant specific resistance of the silicon rod, the larger cross-sectional area causes the electrical resistance of the rod to decrease. In addition, the current density changes from a quantity that is constant along the radius to a quantity that strongly depends on the radius. The resistance is independent of the radius for diameters of the silicon rods of 7-10 mm. At larger diameters, the current density is greater in the interior of the rod than at the periphery.

Because the electrical conductivity of silicon increases with a temperature while the thermal conductivity of silicon decreases with temperature, constriction of the current at the center of the rod results in a temperature gradient from the inside to the outside. The temperature gradient can be so extreme that the rod reaches temperatures of greater than 1460° C. in the interior, whereas the temperature at the outside periphery of the silicon rod is 1100° C. However, a temperature of 1460° C. at the core of the silicon rod causes the silicon in the core of the rod to melt. The silicon can then flow out of the rod, destroying the rod. The precipitation temperature therefore has to be adjusted so that the core temperature does not exceed the melting temperature of silicon.

However, the precipitation temperature should be as high as possible so as to attain a large growth rate of the rod and/or a high precipitation velocity.

The published international patent application WO 97/36822 describes a device for precipitating silicon on silicon rods with the Siemens process. The published document also addresses the problem due to the temperature gradient between the core and the outer surface of the silicon rod. The document proposes to install an additional heater which generates eddy currents in the silicon rod. The eddy currents generate a magnetic AC field with a predetermined frequency, which causes the current density to change. The current density becomes more homogeneous from the peripheral surface of the silicon rod toward the core of the silicon rod, thus producing a more uniform temperature distribution.

The device proposed in the publication is complex, because a second heater, namely the eddy current heater, must be provided in addition to the conventional resistance heater for heating the silicon rods.

The published German patent document DE 198 82 833 T1 discloses a device which takes advantage of the skin effect produced in a conductor at high or medium frequency currents in order to attain a uniform temperature distribution inside a silicon rod. The disclosed device has a single heater, namely a resistive heater. This resistive heater, however, is operated with currents having different frequencies. According to the technical teachings of this document, a low-frequency voltage is initially applied to the silicon rod. When the temperature of the silicon rod exceeds a predetermined value, the low-frequency voltage is switched off and a voltage with a higher frequency is applied. However, the document DE 198 82 833 T1 does not describe in detail a corresponding device for supplying electric energy to the silicon rod.

The method disclosed in the document DE 198 82 833 T1, namely to supply the silicon rods either only with low-frequency currents or only with high or medium frequency currents, disadvantageously generates relatively high inductive losses when only a high or medium frequency voltage is supplied to the silicon rod.

BRIEF SUMMARY OF THE INVENTION

In view of the aforementioned state-of-the-art, the present invention addresses the stated problem by proposing a device for supplying current to at least one silicon rod which produced a more homogeneous temperature distribution and current density distribution in the connected silicon rods. Advantageously, inductive losses are to be kept to a minimum.

The object is attained by the invention in that the device has at least one frequency converter which is suitable and configured to supply electric current from the power grid to the at least one silicon rod connected to the at least one output. The electric current provided by the frequency converter has a higher frequency than the current provided by the AC current regulator. The higher frequency current is urged by the skin affect toward the outer regions of the silicon rod, whereas the lower frequency current causes a high current density in the core. By superimposing the higher frequency current and the low frequency current, an overall more homogeneous current density is attained, which results in a more uniform temperature distribution across the cross-section of the silicon rod.

Advantageously, with the device of the invention, the AC current regulator and the frequency converter supply simultaneously a voltage at their respective outputs. These voltages can be mixed in the device of the invention to provide at the output of the device a mixed voltage which includes low-frequency and medium or high-frequency components. Mixing the output voltages of the AC current regulator and of the frequency converter can be performed at one or several nodes where the two voltages are linked.

According to the invention, an output of the at least one AC current regulator, an output of the at least one frequency converter, and the output of the device, to which the silicon rod is connected, may be electrically connected in series. I.e., the current provided by the frequency converter flows through the output of the AC current regulator before flowing through the silicon rod connected to the output of the device. Conversely, the current provided by the AC current regulator returns to the AC current regulator via the frequency converter after flowing through the silicon rod connected to the output of the device.

Alternatively, a first means for decoupling (decoupling means) the at least one AC current regulator from the at least one frequency converter may be electrically connected between the at least one AC current regulator and the output of the device. Moreover, a second decoupling means for decoupling the at least one frequency converter from the at least one AC current regulator may be arranged between the at least one frequency converter and the output of the device. If the first and the second decoupling means are provided, then the arrangements composed of, on one hand, the at least one AC current regulator and the first decoupling means and, on the other hand, the at least one frequency converter and the second decoupling means may be electrically connected in parallel with respect to the output. I.e., the current provided by the AC current regulator does not flow through the output of the frequency converter, and likewise the current provided by the frequency converter does not flow through the output of the AC current regulator. The AC current regulator and the frequency converter can therefore be sized and designed without taking into account the current of the respective other component.

In a preferred variant of a device of the invention, the device has at least one pair of outputs, each output for a respective silicon rod, and at least one pair of frequency converters, with the pair of frequency converters being associated with the pair of outputs. Each of the two outputs of a pair of outputs can then be connected with an output of a frequency converter of the pair of frequency converters. Moreover, the two frequency converters of a pair of frequency converters can be identical at least with respect to their electrical output quantities. If each frequency converter of a pair has an output and the outputs of a pair of frequency converters form of a chain in which the outputs of the frequency converters are chained with opposite phase, then the outputs of the device may be connected with the outputs of the frequency converters, thereby also chaining the outputs of the device.

Advantageously, the chain of the outputs of the frequency converters has a first outer terminal, a center terminal and a second outer terminal, wherein the output of a first frequency converter of the pair of frequency converters is connected to the first outer terminal and the center terminal, and the output of a second frequency converter of the pair of frequency converters is connected to the center terminal and the second outer terminal.

In addition, an output of the AC current regulator may advantageously be connected with the first outer terminal and the second outer terminal. The chained voltage formed by the voltages at the outputs of the frequency converters is hence also present at the output of the AC current regulator. Because the frequency converters are identical with respect to their output quantities, i.e., in particular are adjusted to the same output voltages, and the output voltages have opposite phase, the chained voltage formed by the voltages at the outputs of the frequency converters is always zero. Therefore, no voltage produced by the frequency converters is present at the output of the AC current regulator, so that the AC current regulator is decoupled from the frequency converters.

The first outer terminal, the center terminal, and the second outer terminal form nodes at which the low-frequency voltage of the AC current regulator and the medium- or high-frequency voltages of the frequency converters are linked.

Conversely, the frequency converter can be decoupled from the AC current regulator by connecting capacitors in the series with the frequency converters, which in conjunction with the silicon rods connected to the outputs of the device form high-pass filters, thereby reducing or eliminating interference from the AC current regulator on the frequency converters.

According to the invention, the frequency converter(s) is/are preferably medium frequency converter(s). The at least one frequency converter can be suitable and configured to provide at the output of the device a mixture of superimposed currents having different superpositioned medium frequencies.

The at least one frequency converter of a device of the invention may further be suitable and configured to adjust the frequency or frequencies of the current(s) provided at the output of the device.

Each device of the invention may include a regulating means which is suitable and configured to adjust the ratio of the power provided by the at least one AC current regulator to the power provided by the at least one frequency converter. Because the diameter and/or the cross-sectional area of the silicon rod changes during the precipitation process, the electrical resistance of the silicon rod also changes. In order to attain an optimal temperature distribution inside the silicon rod in spite of the changing physical properties, the ratio of the heating power of the AC current regulator to that of the frequency converter may be changed. At the beginning of the precipitation process, for example, the heating power of the AC current regulator may be greater in relation to the heating power of the frequency converter than at a later time in the precipitation process. The device may, for example, include regulating means which is suitable and configured to adjust the frequency or frequencies as a function of the diameter and/or the cross-sectional area of the at least one silicon rod.

The AC current regulator of the device of the invention is preferably a line-commutated AC current regulator.

The aforementioned device can be used according to the invention to supply electric current to at least one silicon rod during precipitation of silicon. The method of the invention can be configured so that the ratio of the power provided by the at least one AC current regulator to the power provided by the at least one frequency converter is changed during the precipitation process so as to produce a uniform temperature distribution in the at least one connected silicon rod. More particularly, the power provided to the at least one silicon rod by the at least one frequency converter in relation to the power supplied by the at least one AC current regulator may be increased during the precipitation process.

Additional features and advantages of the present invention will become evident based on the drawings, which show in.

BRIEF DESCRIPTION OF THE SEVERAL VIEWS OF THE DRAWING(S)

DETAILED DESCRIPTION OF THE INVENTION

Figure 1:
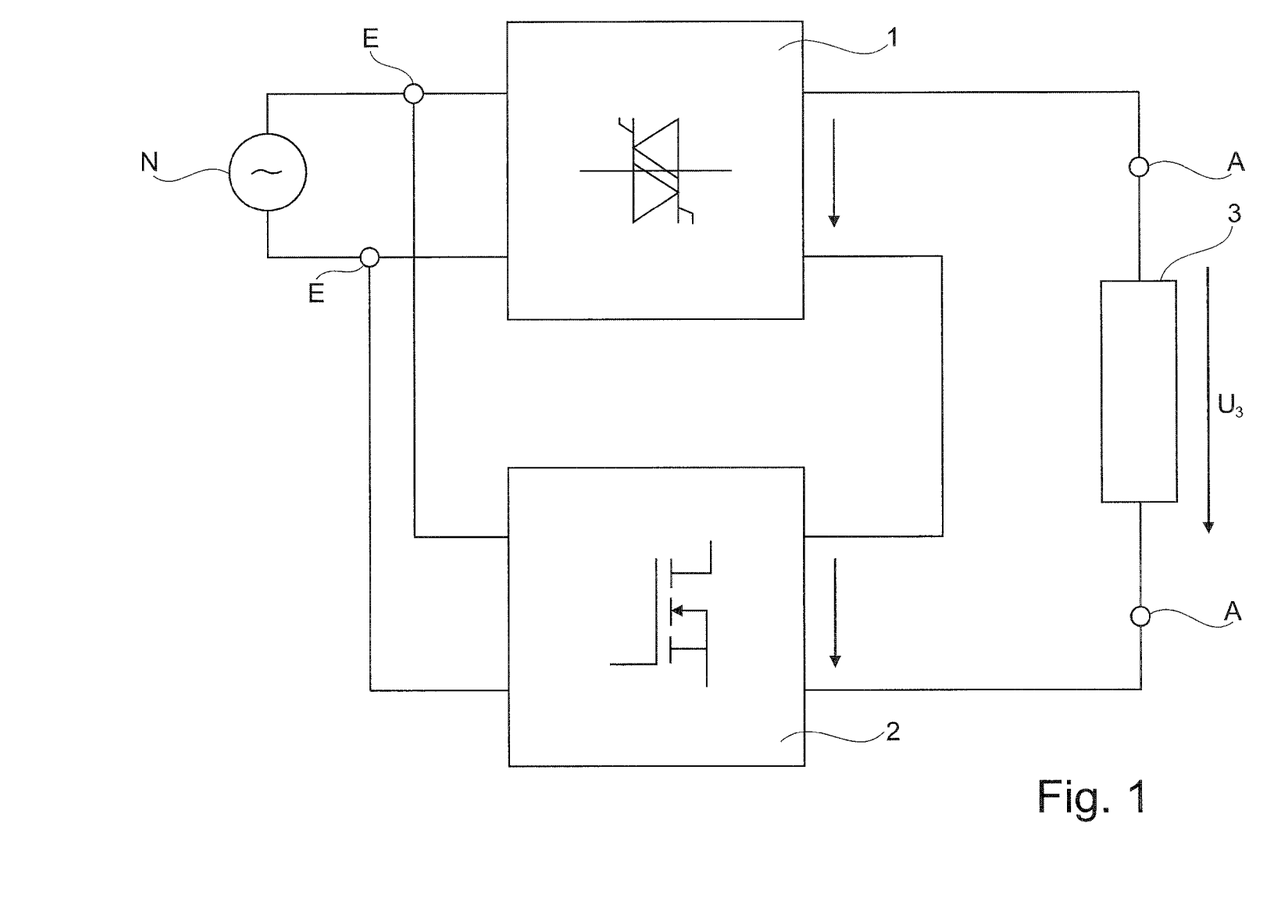
FIG. 1 a device according to the invention with an AC current regulator and a frequency converter, with the outputs connected in series, FIG. 2 a device according to the invention with an AC current regulator and a frequency converter, connected in parallel, FIG. 3 a device according to the invention with two frequency converters having chained outputs, FIG. 4 a voltage-time-diagram of the AC voltage present at the output of the AC current regulator, FIG. 5 a voltage-time-diagram of the AC voltage present at the output of the frequency converter, and FIG. 6 a voltage-time-diagram of the AC voltage present at the output of the device.
Figure 2:
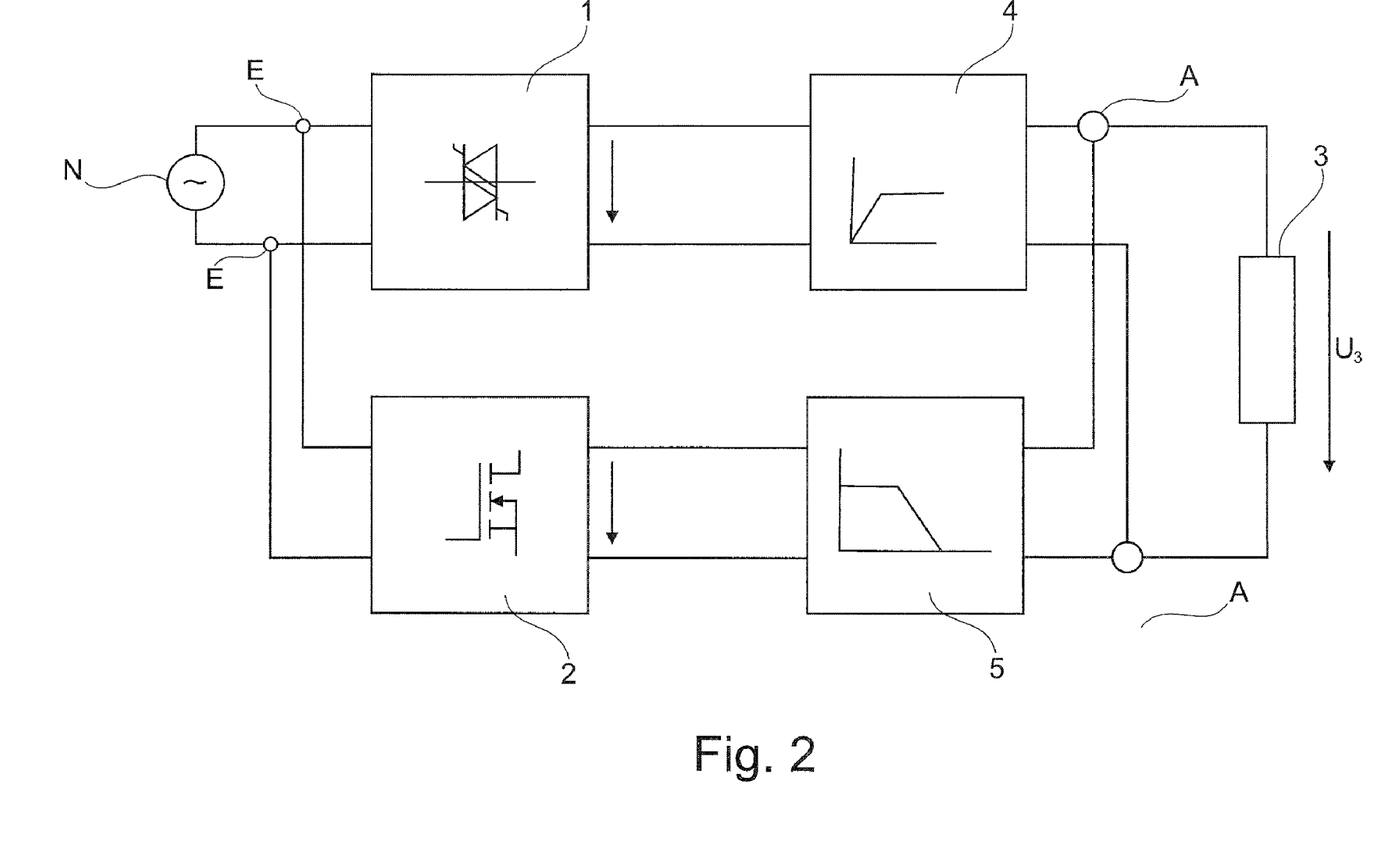
Figure 3:
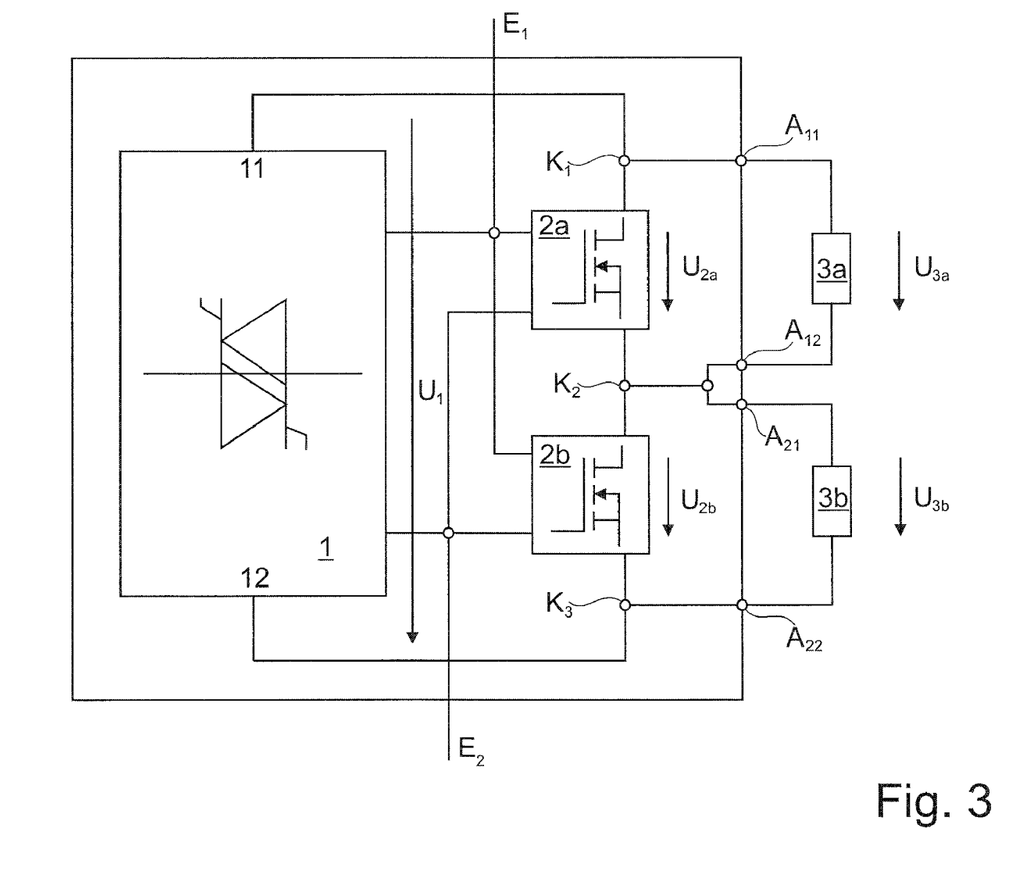

FIGS. 1, 2 and 3 illustrate simplified block circuit diagrams of devices according to the invention. Only the power paths of the devices of the invention are illustrated in FIGS. 1, 2 and 3. Lines for control or regulating signals and sensor signals are not shown in FIGS. 1, 2 and 3. The same types of elements illustrated in the device of FIG. 1, the device of FIG. 2, and the device of FIG. 3 have identical reference symbols.

The device of the invention illustrated in FIG. 1 for supplying current to a silicon rod during precipitation of silicon according to the Siemens process has an input E with two terminals E1, E2. The input E of the device is connected to the power grid N supplying electric energy. A corresponding AC current regulator 1 and a frequency converter 2 are each connected to the input E. Both the AC current regulator 1 and the frequency converter 2 can receive electric energy from the power grid N via the input E.

Both the AC current regulator 1 and the frequency converter 2 can be constructed in a conventional manner. The AC current regulator can be formed, for example, by a circuit arrangement of different power thyristors.

Figure 4:
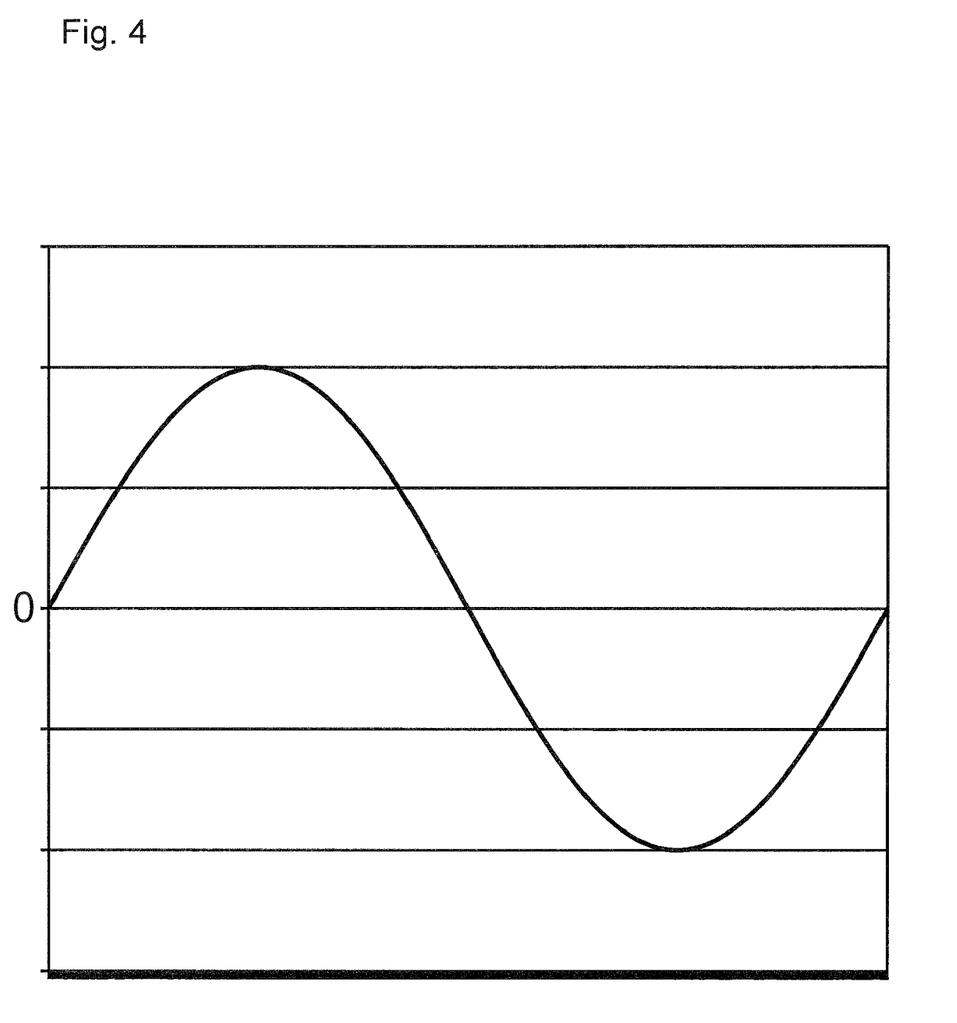
Figure 5:
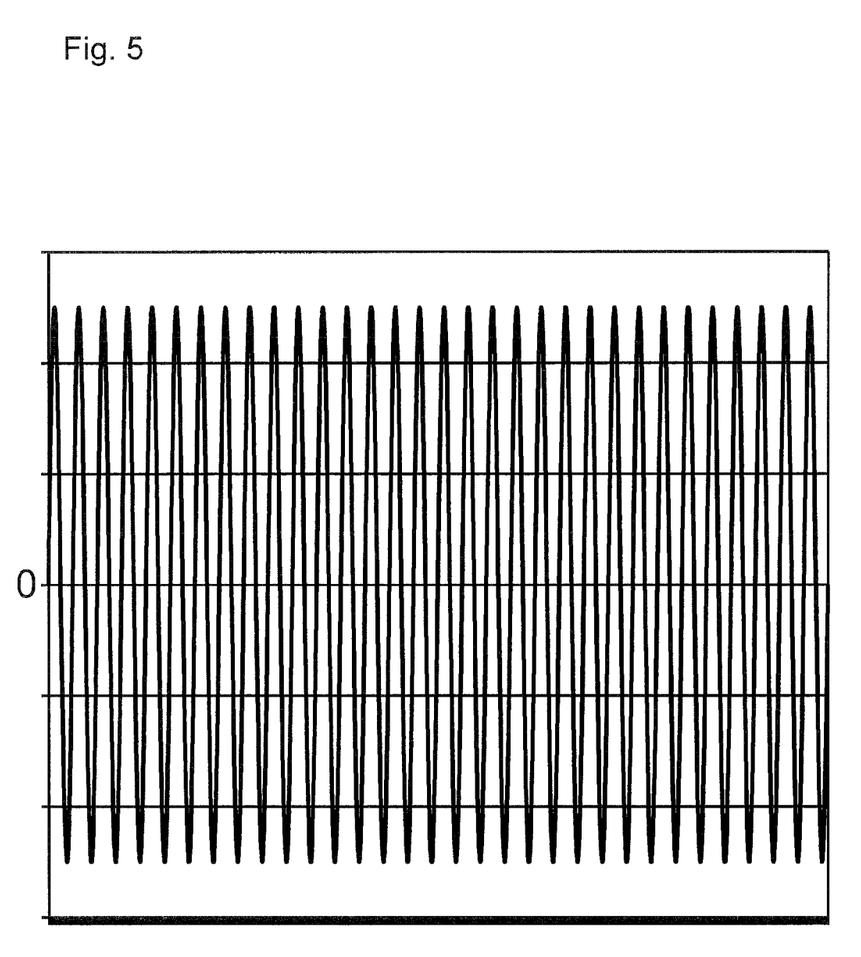

While the AC current regulator 1 is line-commutated, the frequency converter is self-commutated and provides at its output a voltage with a significantly higher frequency than the voltage provided by the AC current regulator 1. FIGS. 4 and 5 show voltage-time-diagrams of the voltages present at the output of the AC current regulator 1 and the frequency converter 2, respectively.

The output of the AC current regulator 1 and the output of the frequency converter 2 are electrically connected in series.

The terminals of the AC current regulator and of the frequency converter, which are not connected with one another at the output, are each connected with a terminal of the output A to which the silicon rod 3 is connected. Silicon derived from trichlorosilane by dissociation is to be precipitated on the silicon rod.

Unlike in the embodiment of the device illustrated in FIG. 1, the outputs of the AC current regulator 1 and the frequency converter 2 of the device illustrated in FIG. 2 are not connected in series. The output of the AC current regulator 1 is connected to the output A of the device by a decoupling means. The output of the frequency converter 2 is similarly connected to the output A of the device by a second decoupling means 5.

The arrangement formed of the AC current regulator 1 and the first decoupling means 4 is arranged electrically in parallel with the arrangement formed of the frequency converter 2 and the second decoupling means 5.

Figure 6:
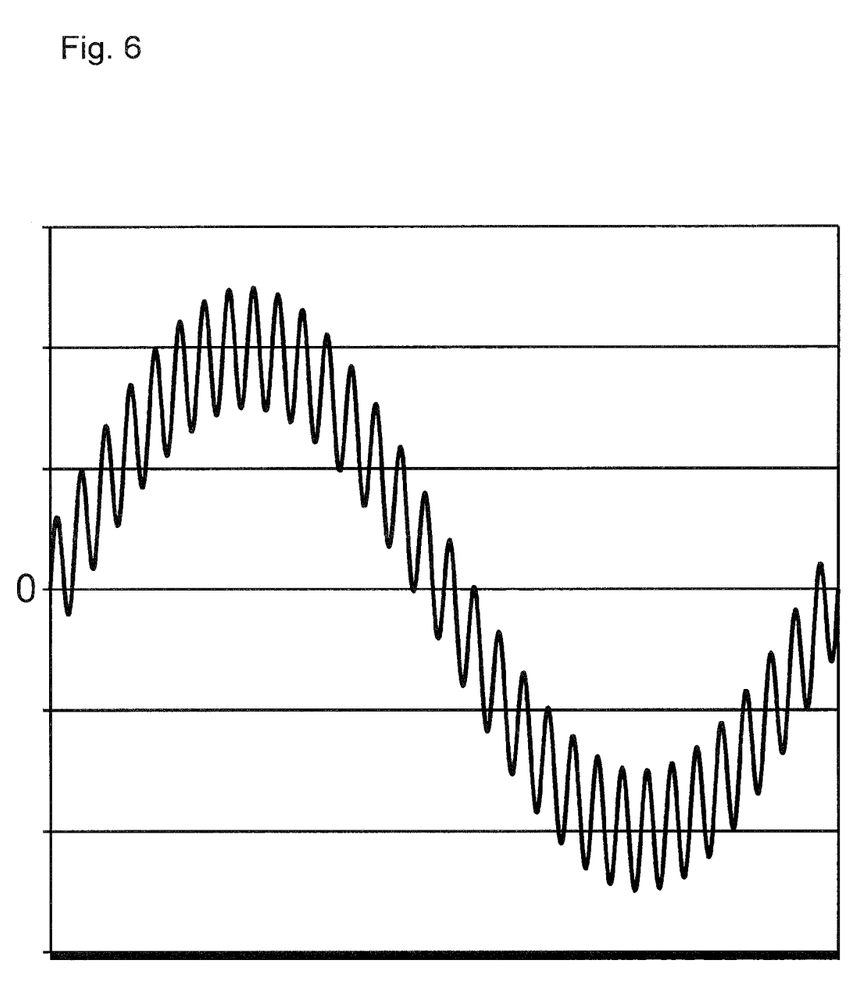

The silicon rod 3 on which silicon is to be precipitated is connected to the output A. A voltage U3 is applied to both the output of the device according to FIG. 1 as well as to the output according to FIG. 2, with a voltage-time-diagram depicted in FIG. 6. The voltage U3 is formed by superposition of the voltages U1 and U2. Accordingly, the output A of the device according to FIG. 1 and the device according to FIG. 2 has a voltage, which drives a current with a fundamental frequency that corresponds to the line frequency and a harmonic spectrum adjusted by way of the frequency converter 2. This current produces a more homogeneous current density in the silicon rod 3 than could be obtained by using a current without a harmonic component. While a current which is driven solely by the voltage U1 of the AC current regulator 1 results in a high current density at the core of the silicon rod 3, the harmonic component produced by the voltage U2 of the frequency converter 2 results in a more homogeneous distribution of the current identity across the entire cross-section of the silicon rod. This prevents the current to be constricted to the core of the silicon rod which produces excessive heating of the core of the silicon rod 3. As a result, the Siemens process for precipitating silicon on the silicon rod can operate at higher temperatures than when using a device where the silicon rod is heated exclusively by a current supplied by an AC current regulator.

Unlike the embodiments of FIGS. 1 and 2, the device of the invention illustrated in FIG. 3 has an AC current regulator 1 and two frequency converters 2a, 2b. The frequency converters 2a, 2b are constructed identically and therefore have identical output quantities. The frequency converters 2a, 2b operate with opposite phase, thus producing at their respective outputs a voltage of identical amplitude, but with a mutual phase shift of 180°.

The device of the invention illustrated in FIG. 3 has an input with two terminals E1, E2 for connecting the device to the power grid (not shown in FIG. 3). Both the AC current regulator 1 and the frequency converters 2a, 2b are each connected to the terminals E1, E2.

The voltages U1 and U2a, U2b provided at the respective outputs of the AC current regulator 1 and the frequency converters 2a, 2b are connected with one another at three nodes K1, K2, K3.

The outputs of the frequency converters 2a, 2b are chained, wherein a first outer terminal K1 of the chain is connected with a first output-side terminal of a first of the two frequency converters 2a, 2b. A second output-side terminal of the first frequency converter is connected with an inner terminal K2 of the chain. A first output-site terminal of a second of the two frequency converters 2a, 2b is also connected with this inner terminal K2 of the chain. The corresponding second output-side terminal is connected with a second outer terminal K3. The outer terminals K1 and K3 of the chain are connected with the output-side terminals 11, 12 of the AC current regulator 1.

The first outer terminal K1 and the center terminal K2 of the chain are connected with a first output of the device of the invention having the terminals A11 and A12. A first silicon rod 3a is connected to this first output.

The center terminal K2 and the second outer terminal K3 of the chain of the frequency converters 2a, 2b are connected with a second output A21 and A22 of the device, to which a second silicon rod 3b is connected.

The output of the first frequency converter 2a and the first silicon rod 3a are connected in parallel. The output of the second frequency converter 2b and the second silicon rod 3b are likewise connected in parallel. The respective parallel circuits are connected in series, and this series connection is connected to the AC current regulator 1.

The output voltages of the AC current regulator and of the frequency converters 2a, 2b are intermixed at the first outer terminal K1, the center terminal K2, and the second outer terminal K3. A mixture of the voltage U2a of the first frequency converter 2a and the voltage U1 of the AC current regulator is produced at the first output A11, A12. A mixture of the voltage U2b of the second frequency converter and the voltage U1 of the AC current regulator is produced at the second output A21, A22.

The voltages at the outputs of the frequency converters 2a, 2b have the same amplitudes, but opposite phases. Accordingly, only the output voltage U1 of the AC current regulator is present between the node K1 and the node K3, because the voltages U2a and U2b cancel each other. This prevents feedback of the output voltages of the frequency converters to the AC current regulator 1.

By arranging the capacitors (not illustrated) at the outputs of the frequency converters 2a, 2b, the voltage U1 of the AC current regulator 1 can be prevented to affect the two frequency converters 2a, 2b. The capacitors at the outputs of the frequency converters 2a, 2b form in conjunction with the loads connected to the outputs, in particular the ohmic components of the loads, a high-pass which keeps the low frequencies of the voltage U1 away from the frequency converters 2a, 2b. Compared to the devices according to FIGS. 1 and 2, no components of the device according to FIG. 3 are advantageously connected in series with the low-frequency power supply. This eliminates coupling between the low-frequency power supplied by the AC current regulator and the medium and/or high-frequency currents supplied by the frequency converters. The frequency converters can also advantageously be easily combined with an already existing power supply system having an AC current regulator to obtain a device according to the invention. An existing device can therefore be easily upgraded.

The invention claimed is:

1. Device for supplying a current to an object, the device comprises
   an input (E) configured for connecting the device to an electric power grid (N) for supplying electric energy,
   at least one output (A) to which the object is to be connected,
   at least one AC current regulator (1) configured to supply the object connected to the at least one output (A) with electric current from the electric power grid (N), and
   at least one frequency converter (2) configured to supply the object connected to the at least one output (A) with electric current from the electric power grid (N), with the electric current having a higher frequency than the current provided by the AC current regulator (1);
   the object being supplied simultaneously with a lower frequency current provided by the AC current regulator (1) and the higher frequency current supplied by the at least one frequency converter (2).

2. Device according to claim 1, wherein an electric voltage mixed from voltage components having different frequencies is provided by the device at the at least one output (A) of the device.

3. Device according to claim 2, further comprising nodes at which the voltages provided by the AC current controller (1) and by the at least one frequency converter (2) are linked for mixing the voltage provided at the output.

4. Device according to claim 1, wherein an output of the at least one AC current regulator (1), an output of the at least one frequency converter (2), and the output of the device, to which the the object is connectable are electrically arranged in series.

5. Device according to claim 1, wherein a first decoupling means (4) for electrically decoupling the at least one AC current regulator (1) from the at least one frequency converter (2) is arranged between the at least one AC current regulator (1) and the output (A), and a second decoupling means (5) for decoupling the at least one frequency converter (2) from the at least one AC current regulator (1) is arranged between the at least one frequency converter (2) and the output (A).

6. Device according to claim 5, wherein the arrangements comprised of the at least one AC current regulator (1) and the first decoupling means (4) and the at least one frequency converter (2) and the second decoupling means are arranged electrically in parallel.

7. Device according to claim 1, wherein the device comprises at least one pair of the outputs for a corresponding object, and the at least one frequency converter (2) comprises at least one pair of frequency converters (2a, 2b) associated with the pair of outputs.

8. Device according to claim 7, wherein each of the two outputs of the pair of outputs is connected with a corresponding output of one frequency converter (2a, 2b) of the pair of frequency converters (2a, 2b).

9. Device according to claim 8, wherein the two frequency converters (2a, 2b) of a pair of frequency converters (2a, 2b) are identical at least with respect to their electric output quantities.

10. Device according to claim 8, wherein each frequency converter (2a, 2b) of a pair comprises an output, and that the outputs of a pair of frequency converters (2a, 2b) form a chain, with the outputs of the frequency converters (2a, 2b) being chained with opposite phase.

11. Device according to claim 10, wherein the chain comprises a first outer terminal (K1), a center terminal (K2), and a second outer terminal (K3), and wherein the output of a first frequency converter (2a) of the pair of frequency converters (2a, 2b) is connected to the first outer terminal (K1) and the center terminal (K2), and the output of a second frequency converter (2b) of the pair of frequency converters (2a, 2b) is connected to the center terminal (K2) and the second outer terminal (K3).

12. Device according to claim 11, wherein an output of the AC current regulator (1) is connected to the first outer terminal (K1) and the second outer terminal (K3).

13. Device according to claim 1, wherein the at least one frequency converter (2) is a medium frequency converter.

14. Device according to claim 1, wherein the at least one frequency converter (2) is configured to provide at the output (A) of the device a mixture of superimposed currents having different frequencies.

15. Device according to claim 1, wherein the at least one frequency converter (2) is configured to adjust at least one frequency of at least one current provided at the output (A) of the device.

16. Device according to claim 1, wherein the device comprises a regulating means to adjust a ratio of power provided by the at least one AC current regulator (1) to power provided by the at least one frequency converter (2).

17. Device according to claim 1, wherein the device comprises a regulating means to adjust the frequency or frequencies as a function of the diameter and/or cross-sectional area of the object.

18. Device according to claim 1, wherein the at least one AC current regulator (1) is a line-commutated AC current regulator.

19. The device according to claim 1, wherein the object is a silicon rod.

20. The device according to claim 19, wherein the current is supplied to the silicon rod during precipitation of silicon according to a Siemens process.

21. Method for supplying current to an object, the method comprises the steps of:
   providing an input (E) for connecting to an electric power grid (N) for supplying electric energy, providing at least one output (A) for connecting the object, providing at least one AC current regulator (1) for supplying the object connected to the at least one output (A) with electric current from the electric power grid (N), providing at least one frequency converter (2) for supplying the object connected to the at least one output (A) with electric current from the electric power grid (N), with the electric current having a higher frequency than the current provided by the AC current regulator (1); and simultaneously supplying the object with a lower frequency current provided by the AC current regulator (1) and the higher frequency current supplied by the at least one frequency converter (2).

22. The method according to claim 21, wherein a ratio of power provided by the at least one AC current regulator (1) to power provided by the at least one frequency converter (2) is changed.

23. The method according to claim 22, wherein the power provided to the object by the at least one frequency converter (2) in relation to the power supplied by the at least one AC current regulator (1) is increased.

24. The method according to claim 21, wherein the object is a silicon rod.

25. The method according to claim 24, wherein the current is supplied to the silicon rod during precipitation of silicon according to a Siemens process.

26. The method according to claim 21, wherein an electric voltage provided at the at least one output (A) is mixed from voltage component having different frequencies.

* * * * *